H. BAILEY.

Dumping-Wagon.

No. 9,067. Reissued Feb. 10, 1880.

Witnesses,

W. A. Bertram

Dr L. H. Barclay.

Inventor

HAMILTON BAILEY by

R. D. Williams.

Attorney.

N. PETERS, PHOTO-LITHOGRAPHER, WASHINGTON, D. C.

UNITED STATES PATENT OFFICE.

HAMILTON BAILEY, OF HARRISBURG, PENNSYLVANIA.

DUMPING-WAGON.

SPECIFICATION forming part of Reissued Letters Patent No. 9,067, dated February 10, 1880.

Original No. 147,468, dated February 17, 1874; Reissue No. 6,783, dated December 7, 1875. Application for Reissue filed November 18, 1879

*To all whom it may concern:*

Be it known that I, HAMILTON BAILEY, of the city of Harrisburg, in the county of Dauphin and State of Pennsylvania, have invented certain new and useful Improvements in Dumping-Wagons; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates in general to dumping-wagons, and in particular to that class of wagons used for carrying coal and adapted to deliver the coal through chutes across the sidewalk and into the cellar; and it consists in a wheeled conveyance of the class named provided with an extensible chute, which, by the simple act of retracting it toward the cellar-way or coal-hole, is caused to occupy the proper position beneath the end-gate of the wagon or cart.

The invention consists, further, in certain details of construction not here necessary to enumerate, as they are also made the subject of the claims.

Figure 1:
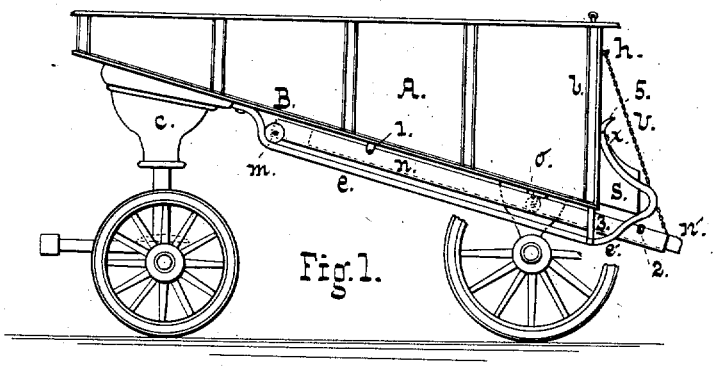
Figure 2:
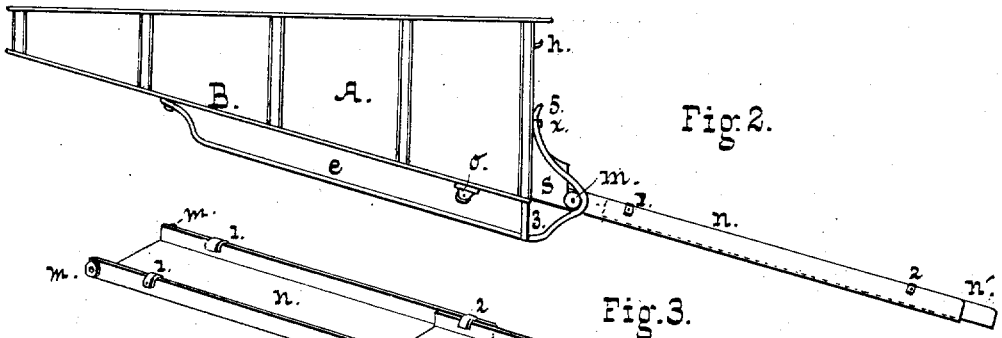
Figure 3:
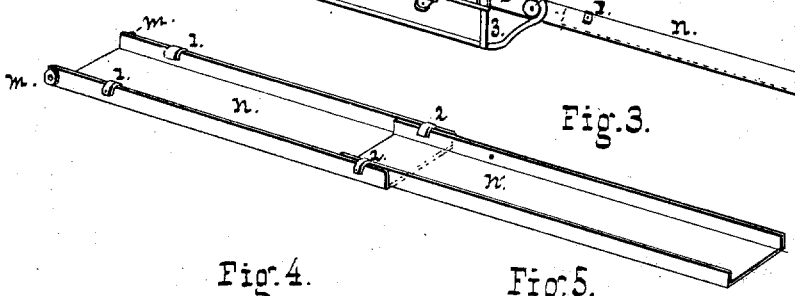
Figure 4:
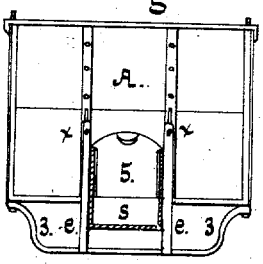
Figure 5:
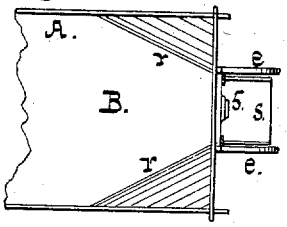

In the accompanying drawings, Figure 1 represents a side elevation of the wagon. Fig. 2 is a side view of the body or bed, showing the extension-chute partially extended. Fig. 3 is a perspective view, showing the extension-chute detached from the vehicle and its sections fully extended. Fig. 4 is a rear elevation of the vehicle-bed. Fig. 5 is a plan view of the same.

Like letters of reference refer to similar parts.

A represents the vehicle-bed, made with horizontal top and rearwardly-sloped bottom, with sufficient down grade to run nut-coal therefrom by the act of gravity when the slide 5 is opened. To avoid lodgments of coal in the rear corners of the bed, the triangular turnouts *r r* are employed to direct the coal to the exit.

Beneath the bed-bottom, and parallel therewith, are attached thereto the guides *e e'*, which serve as ways for the rollers *m m*. Instead of rollers, simple lugs or clips may be used. Said guides are curved and located as shown, that the extension-chute sections *n n'* may be readily shifted to their place of retreat under the bed, where they may be securely transported.

The rods constituting the guides *e e' e e'* are continued to the rear of the bed, making the detours or return-loops shown between the points *e'* and *x*, where they are fixedly attached to the bed.

The object of this construction is to allow the travelers *m m* to shift the front end of section *n* into position beneath the spout *s*, so that communication from the latter to the former is rendered certain, and communication from section *n* to section *n'* is likewise certain, because said sections are combined with each other as slip-joints, the clips 1 2 serving to guide and align them.

The guides *e e' e e'* are, moreover, transversely connected, as shown in Fig. 4, directly beneath the rear end of the bed, and braces 3 3 serve to stay the rod structure firmly in position. A stirrup is thus formed by said transverse connection, on which the rear ends of the folded chutes are supported, their front ends being upheld by the parts *m m* on the guides *e e' e e'*, as shown in Fig. 1.

It may be observed that the chute-fixture is thus positively and definitely connected with the vehicle, for the rollers *m m* or lugs or studs that may be employed in lieu thereof do not allow the chute-sections to become disengaged from the guide-structure *e e' e e'* by accidental jostling.

The chute-sections *n n'* may be any number, made trough form, and so graded that the section next the vehicle-bed may enter as a slip-joint into the next section loosely, and be connected therewith by clips 1 2, made hook form, or simply by straps turned inward to overlap and embrace the adjacent edges, and so located to admit of the full extension of the sections *n n'*, as shown in Fig. 3. When fully extended, a shoulder or stop is provided to prevent the complete withdrawal of section *n'* from section *n*. An elastic roller, *o*, is also shown in Figs. 1 and 2, designed to hold the chute-sections with a yielding pressure and prevent them from rattling. A chain, *v*, attached as shown at *h*, is also used to hold the chute-sections *n n'* fully sheathed and taut against the said roller *o*.

The rear wall of the bed A is transversely divided into two nearly equal sections, the upper section being hinged to the lower section, as shown in Fig. 4. The object of this construction is to facilitate loading, as the upper section may be laid down outward to lessen the height of the rear end of the cart, coal being usually shoveled into the bed from a place at its rear.

The method of operating my vehicle is as follows: It being loaded and run to the desired place, the extensible chute is drawn from its retreat beneath the bed and its unsupported end located at a window, doorway, or vault-opening, as the case may be. The slide 5 then being opened, the coal will be impelled by gravity to discharge itself to the place desired, thus avoiding much obstruction to travel and leaving few traces of coal on the sidewalk.

It will be seen that the chute, from the inception of its motion to the rear, occupies a position directly beneath the end-gate of the wagon, so that when the coal-hole is near the curb but a slight retraction of the chute is necessary or desirable.

What I claim is—

1. In a dumping-wagon, a chute consisting of one or more sections carried upon a suitable support beneath the wagon-bed, and adapted, as set forth, to be retracted from the wagon-body, and in being so retracted to constitute a conduit from the end-gate to the place of deposit of the contents of the wagon, substantially as described.

2. In a dumping-wagon, a chute consisting of one or more sections occupying a position under the body of the wagon and extensible to the rear in a line parallel to the wagon-bed, in such manner as to serve as a conduit from the end-gate to the place of deposit of the contents of the cart, substantially as described.

3. A dumping-wagon having under its bed ways or guides for an extensible chute, in combination with a chute consisting of one or more sections, adapted to the purpose set forth.

4. A dumping-wagon having a stirrup or hanger beneath the bed, serving as a support for an extensible chute, and upon which the chute slides in being retracted, substantially as set forth.

5. In a dumping-wagon having a rearwardly-pitched bed and guides or carriers thereunder, an extensible chute adapted to register with the end-gate, substantially as described.

6. In a coal-vehicle or dumping-wagon, a pair of parallel guides extending from a point beneath the wagon-bed beyond the end-gate, and adapted to effect the registration of the chute therewith, as set forth.

7. In a dumping-wagon, a pair of parallel guides under the body of the same, sustaining a chute which, by the simple act of withdrawal to the rear, is caused to assume a proper position with reference to the end-gate to serve as a conduit, substantially as set forth.

8. In combination with the wagon having a spout extending beyond the end-gate and provided with guides, as set forth, the chute mounted thereon on rollers or lugs, and thereby made extensible to the rear, as and for the purpose set forth.

9. The coal-vehicle bed A B, in combination with one or more extensible chute-sections carried on ways thereunder to supplement the discharge-spout, the said sections being connectedly applied thereto as a suitable adjunct of the vehicle, and so arranged that the act of extending the sections to the rear will secure the correct application of one of them beneath the discharge-spout, as set forth.

10. In a coal-vehicle provided with one or more extensible chute-sections carried thereunder, as described, an elastic roller, *o*, to prevent rattle and noise as the sections are withdrawn, as set forth.

11. In a coal-vehicle, the parallel guides *e e'*, arranged beneath the bed, in combination with the extensible chute having suspension-points *m m*, as set forth.

Witness my hand this 14th day of November, 1879.

HAMILTON BAILEY.

Witnesses:
JOHN C. GITTINGER,
W. A. BERTRAM.